United States Patent Office 3,373,337
Patented Mar. 12, 1968

3,373,337
INPUT REGULATED POWER SUPPLIES
Han-Min Hung, Bayside, N.Y., assignor to Forbro Design Corp., New York, N.Y., a corporation of New York
Filed June 16, 1965, Ser. No. 464,367
4 Claims. (Cl. 321—16)

The present invention concerns regulated power supplies utilizing silicon controlled rectifiers and, in particular, adjustable current limiting, over-voltage and over-temperature protection for such supplies.

Regulated power supplies of the type to which the present invention relates employ silicon controlled rectifiers as their regulating means. The silicon controlled rectifiers are employed between the AC power line and the voltage changing power transformer and are controlled by means of a phase controlled signal derived from the same AC line. This mode of operation provides a control of the duty-cycle of the silicon controlled rectifiers in accordance with the demands of the power supply load and operates to maintain the DC output constant in the presence of line voltage and load resistance changes.

In the past current limiting of such a regulated power supply has been achieved by applying an overload responsive signal to the amplifier which drives the phase shifting network in a direction to reduce the duty-cycle of the silicon controlled rectifiers during overload and thus to counteract the overload. Over-voltage and over-temperature conditions in such power supplies have been taken care of by means of power interruption devices responsive to the over-voltage or over-temperature condition.

In accordance with the present invention pulses are generated by means of a saturable reactor pulse generator which serve to initiate conduction of the silicon controlled rectifiers. The pulses are controlled by an AC synchronous signal phase shifted in accordance with amplified error signals from the main DC amplifier.

Current limiting signals are applied to the saturable reactor for reducing the duty-cycle of the silicon controlled rectifiers to alleviate the over current condition.

Also in accordance with the present invention over-voltage and over-temperature conditions generate signals from saturating and thereby preventing controlled rectifier which are applied to the saturable reactor to prevent it from saturating and thereby preventing controlled rectifier triggering pulses from being generated so that the rectifiers will not conduct as long as the over-voltage or over-temperature condition exists. The over-voltage and over-temperature control circuit has fail-safe characteristics since failure of any of its semi-conductor components will also prevent triggering pulses from being generated.

Therefore it is one object of the present invention to provide improved over-current, over-voltage and over-temperature protections in a regulated power supply.

Another object is to provide such protection which is faster operating than previously available means.

Still another object is to provide such protection which is more reliable than previously available means.

These and other objects of the present invention will be apparent from the detailed description of the invention given in connection with the various figures of the drawing.

Figure 1:
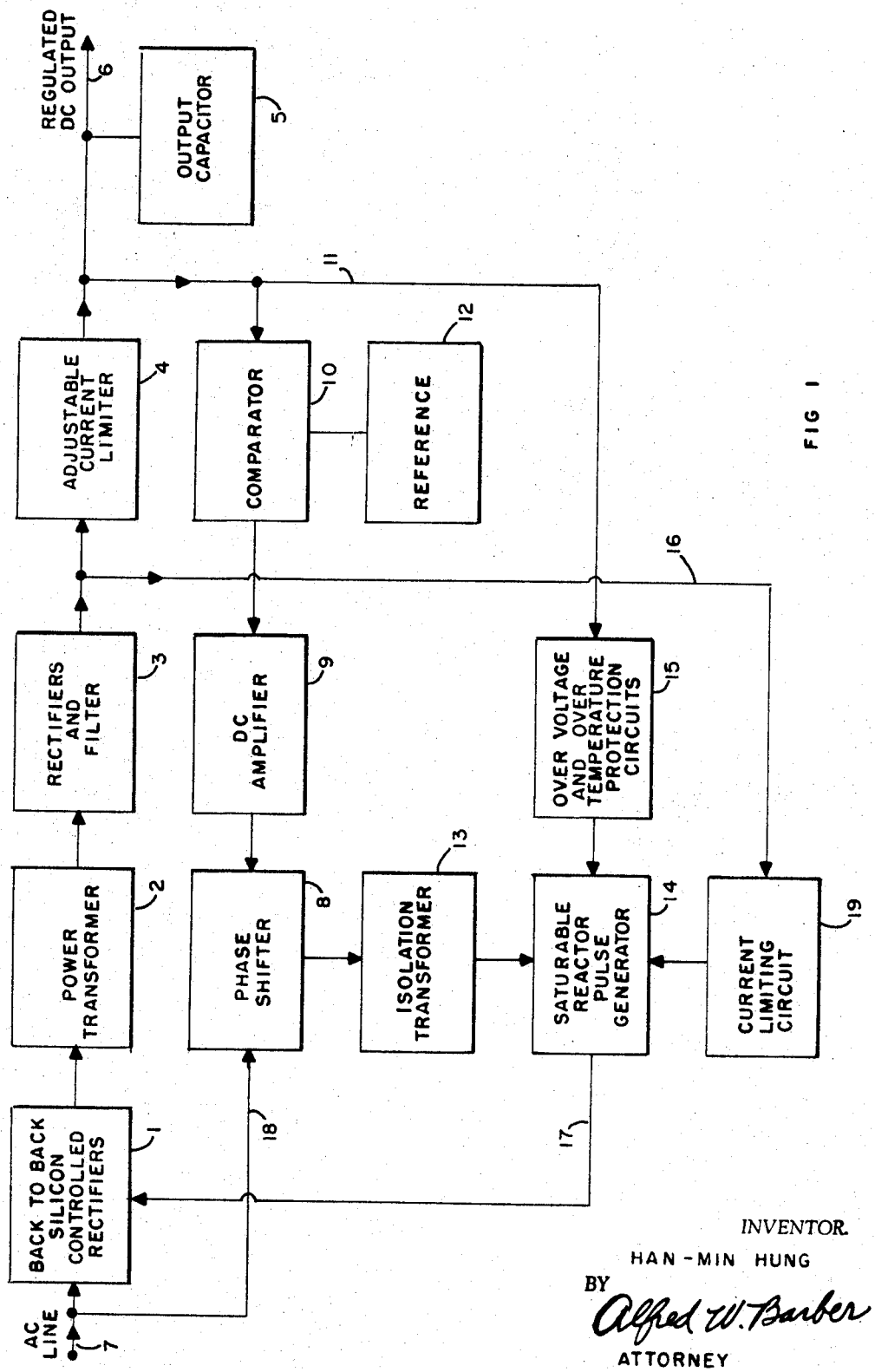
FIGURE 1 is a block diagram of one form of the present invention.

FIGURE 1 is the block diagram of a regulated constant voltage DC power supply with current limiting, over-voltage and over-temperature protection provided in accordance with the present invention. The AC input 7 feeds silicon controlled rectifier 1 in series with the primary of power transformer 2. The silicon controlled rectifiers produce chopped sinusoidal voltage with varying duty-cycle conduction as will be set forth in detail below. This chopped voltage passing through transformer 2 is rectified and filtered by rectifiers and filter 3. The filtered DC voltage passes through the adjustable current limiter 4 and on to the output 6. This output is shunted by the output filter capacitor 5. This output 6 is also fed back over lead 11 to voltage comparator 10 where it is compared with a reference voltage 12. If the output voltage differs from the desired value, an error voltage is developed in comparator 10 which is applied to DC amplifier 9 where it is amplified sufficiently for effective use in further functions of the control system. The output of DC amplifier 9 is applied to phase shifter 8 where it variably delays the phase of an AC voltage derived from the AC line over line 18. The phase shifted AC signal thus provided is applied to isolation transformer 13 which applies two 180 degree out-of-phase voltages to saturable reactor pulse generator 14 as will be set forth in detail below. Two isolated triggering pulses 180 electrical degrees apart are generated by the pulse generator 14. These pulses are fed to the gates of the silicon rectifiers 1 over line 17. The triggering pulses reaching the gates of the silicon controlled rectifiers are delayed by the sum of the phase lag introduced by phase shifter 8 and the phase lag introduced by saturable reactor 14. The delay provided by phase shifter 8 and hence the total delay is controlled by the amplified error votlage from amplifier 9 in such a direction as to increase or decrease the duty-cycles of the silicon controlled rectifiers so as to maintain the output voltage at 6 constant.

The voltage drop across adjustable current limiter 4 is applied to current limiting circuit 19 over line 16. Current limiting circuit 19 is coupled to saturable reactor 14 in such a way as to cause over-current signals to increase the phase lag in saturable reactor 14 thereby reducing the duty-cycles of the controlled rectifiers and thereby reducing the output of the power supply.

The over-voltage and over-temperature protection circuits 15 when either condition exceeds a predetermined state turns on a circuit which applies signals to saturable reactor 14 sufficient to stop pulse generation as will be described in detail below. When the pulses stop, the input power is blocked completely from reaching the input to the power supply at power transformer 2.

Figure 2:
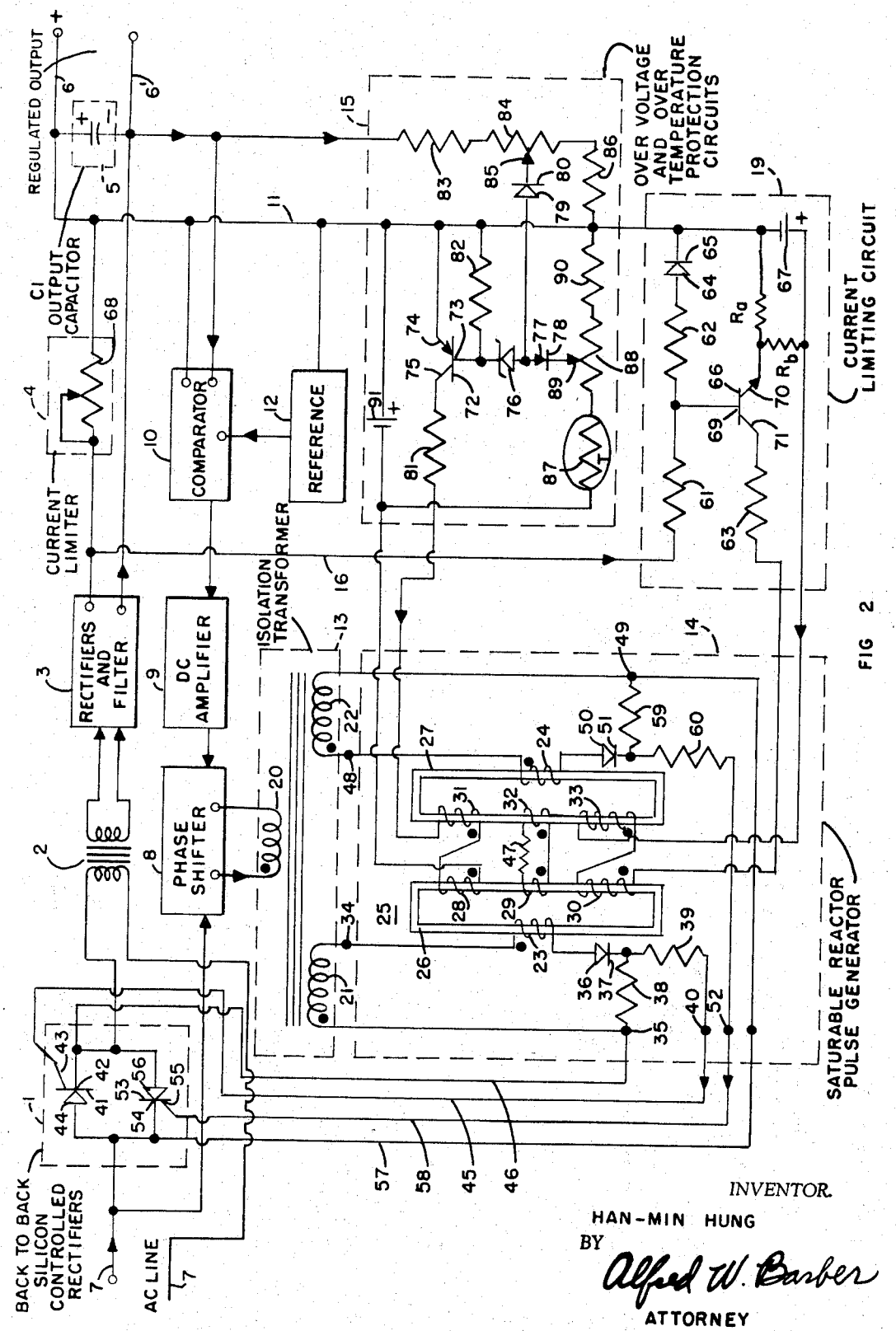
FIGURE 2 is a schematic circuit diagram partly in block diagram showing some of the details of a regulated power supply in accordance with the present invention.

FIGURE 2 shows details of a number of the more important circuits shown merely as blocks in FIGURE 1. The designations of FIGURE 2 utilize the same numbers for corresponding functional blocks. This description will be continued from that of FIGURE 1 by pointing out the functions of the various circuit details shown in FIGURE 2. A delayed sinusoidal voltage from phase shifter 8 is applied to primary 20 of isolation transformer 13. The dual secondaries 21 and 22 are connected to gate windings 23 and 24 respectively of saturable reactor 25 observing the polarities indicated by the polarity dots associated with these windings. The saturable reactor 25 includes the two cores 26 and 27 made of square-loop material. Each of cores 26 and 27 carries four windings namely; 23, 28, 29, 30 and 24, 31, 32, 33 respectively. The proper polarities for these windings are indicated by means of the polarity dots. Windings 30 and 33 are control windings and are fed from current limiting circuit 19 in order to function when current limiting is called for. Similarly windings 28 and 31 are fed from over-voltage and over-temperature protection circuits 15 in order to function under these conditions. Windings 29 and 32 are provided for resetting cores 26 and 27. Under normal operating conditions of the system control windings 30–33 and 28–31 are inactive.

Now, when the induced sinusoidal voltage across winding 21 is during the half cycle which makes terminal 34 positive with respect to terminal 35, diode 36–37 will be receiving a forward bias and the major part of the voltage across winding 21 will be placed across gate winding 23. As this voltage increases sinusoidally, a point will be reached at which core 26 will saturate and a sharp positive going pulse will be generated across terminals 35–40. This pulse is applied directly between gate 43 and cathode 42 of silicon controlled rectifier 41 over leads 45 and 46 respectively. Resistor 38 is a bleeder resistor and resistor 39 is effectively in series with SCR gate 43. They are used to minimize the loading effect of the SCR on the saturable reactor circuit. Now, when core 26 saturates, the induced voltage pulse just mentioned also induces a pulse in winding 29. This induced pulse is applied through resistor 47 to winding 32 polled in a direction which can be seen from the polarity indicating dots adjacent to the windings so as to reset core 27. While the above is going on, a negative going half of a sinusoidal voltage is induced in winding 22 keeping terminal 48 negative with respect to terminal 49. This places a negative voltage on anode 50 with respect to cathode 51 of diode 50–51 so that current is effectively blocked from flowing in winding 24. Hence no saturation will be produced in core 27 during this half cycle and no output pulse will be generated across terminals 49 and 52. These terminals 49 and 52 are connected to cathode 54 and gate 55 of silicon controlled rectifier 53 over leads 57 and 58 respectively. Hence no firing pulse will be applied to SCR 53 during this half cycle of the sinusoidal voltage.

Similarly, when the sinusoidal voltage is passing through the half cycles which make terminal 48 positive with respect to terminal 49, the anode 50 of diode 50–51 will be positive with respect to cathode 51 and current will flow through this diode and hence through winding 24. As in the first instance described above, flux will build up in core 27 until saturation is reached at which time a sharp positive going pulse will be produced across resistor 59 which will be applied to gate 55 through resistor 60 and over lead 58. At the same time a pulse will be induced in winding 32 which applied through resistor 47 to winding 29 will serve to reset core 26. In this manner SCR's 41 and 53 are triggered and cores 26 and 27 are reset on alternate half cycles of the phase shifted sinusoidal voltage derived from AC line 7.

In order to control and regulate the output from the regulated power supply using these two SCR's which are fired as described above, the phase of the sinusoidal voltage and hence the firing instants are controlled in phase shifter 8 under the control of an error signal fed back from a circuit which compares the power supply output with a reference voltage. This operation is accomplished by means of comparator 10, reference 12, and DC amplifier 9 in any suitable manner, such systems being well known in the prior art. Since such systems are well known and as such are not an explicit part of the present invention, details will not be shown nor discussed.

The present invention is concerned primarily with methods of and means for rendering pulse generator 14 less active or inactive in the presence of over-current, over-voltage or over-temperature conditions as set forth below.

One form of the current limiting circuit as shown in FIGURE 2 includes resistors 61, 62, 63 $R_a$, $R_b$ diode 64–65, transistor 66 and a source of reference voltage such as battery 67. The over-current signal is derived from the voltage drop across adjustable resistor 68 which being in series with output lead 6 carries the power supply output current. The signal across resistor 68 is applied over leads 11 and 16 to the voltage divider formed by resistors 61 and 62 and diode 64–65 connected in series. The portion of the signal voltage across resistor 62 and diode 64–65 is applied between base 69 and emitter 70 of transistor 66. Since the signal voltage thus is applied in a polarity which makes diode anode 64 positive with respect to cathode 65, diode 64–65 receives a forward bias and is conducting. The division of voltage as described above taken with the forward drop across diode 64–65 provides temperature compensation for the similar change which takes place in the base to emitter voltage of transistor 66. Resistors $R_a$ and $R_b$ form a voltage divider across voltage source 67. The voltage drop across $R_a$ is made approximately equal to the forward drop of diode 64–65. When the over-current signal reaches a point sufficient to provide initial conduction bias to transistor 66, current will flow from collector 71 through windings 30 and 33 and bias source 67 and resistor $R_a$ to emitter 70. Windings 33 and 30 are connected in such a polarity that current from transistor 66 flowing through them causes flux in cores 26 and 27 which opposes the normal firing circuit flux and thus delays the firing time of SCR's 41 and 53 by delaying the time at which saturation takes place. This delayed firing reduces the duty cycle of the SCR's and consequently acts to reduce the output voltage and current of the power supply. This limiting of the power supply output current may be controlled by varying the value of adjustable resistor 68. As soon as the over-current condition is removed, current limiting windings 30 and 33 become deactivated and the system automatically returns to normal operation.

The over-voltage and over-temperature protection circuits operate in an analogous manner to the over-current limiting circuit with exception that they provide adequate opposing flux in the saturable reactor to cease generation of the SCR firing pulses and the power supply then loses its output. The over-voltage and over-temperature protection circuits include transistor 72 having a base 73, an emitter 74 and a collector 75, zener diode 76, diodes 77–78 and 79–80, and resistors 81, 82, 83, 84, 86, 87, 88 and 90. Resistor 84 is adjustable by means of adjustable contact 85 and provides the adjustment for the over-voltage level. Resistor 88 is also adjustable by means of adjustable contact 89 providing for over-temperature adjustment. Resistor 87 is temperature sensitive such as a thermistor and is placed on the component of the power supply the over-temperature of which is to be monitored. The output voltage of the power supply is across the voltage divider formed by resistors 83, 84 and 86. A suitable negative bias supply illustrated by battery 91 is bridged by another voltage divider formed by thermistor 87 and resistors 88 and 90. The potential at contact 85 is mixed with that at contact 89 by means of diodes 79–80 and 77–78. The anodes 77 and 79 are tied together to the anode of zener diode 76 and its cathode is connected to the base 73 of transistor 72. Resistor 82 provides a path for the transistor collector to base leakage current. When either the over-voltage or the over-temperature signal or their combination is higher than the sum of the zener voltage of zener 76, the forward drop of one of the diodes and the transistor threshold base to emitter voltage, zener 76 will conduct and cause transistor 72 to conduct. When transistor 72 conducts, current will flow from collector 75 through limiting resistor 81 and control windings 28 and 31 driven by the bias from bias source 91. Windings 28 and 31 are connected in such a direction as to cause the flux produced by this current to oppose the flux normally produced by gate windings 23 and 24 in cores 26 and 27. This opposing flux is large enough to cancel the flux from the gate windings. Thus cores 26 and 27 will not saturate due to the current in the gate windings and no triggering pulse will be generated for the SCR's during either over-voltage or over-temperature conditions. This effectively blocks AC power input to the power supply since the SCR's remain nonconducting.

As soon as the over-voltage or over-temperature condition is removed, the protection circuits become inactive and the power supply returns to normal operation. For normal operation of the power supply, contact 85 is set so that the voltage at its point on resistor 84 with respect to line 11 does not exceed the zener voltage plus the diode forward drop plus the transistor conduction voltage as outlined above. Also thermistor 87, which as connected should have a negative temperature coefficient, and the point of contact 89 on resistor 88 are chosen so that the voltage at contact 89 with respect to line 11 does not exceed the zener voltage plus the diode voltage plus the transistor conduction voltage for all normal operating temepratures of the component which the over-temperature circuit monitors. As set forth above, when the output voltage of the power supply exceeds a predetermined limit for any reason, the over-voltage protection circuit operates to protect the power supply and the load connected to it as well. The over-temperature protection circuit will turn off the silicon controlled rectifiers to block the input power so that the power supply will be protected from further heating. As has been shown and described both over-voltage and over-temperature protection circuits are providde with adjustments which can be set for predetermined conditions of maximum voltage and maximum temperature.

While only one form of the present invention has been shown and described, many modifications will be apparent to those skilled in the art within the spirit and scope of the invention as set forth in particular in the appended claims.

What is claimed is:

1. In a regulated power supply, the combination of, a power transformer including primary and secondary windings, rectifier and filter means for producing a direct current connected to said secondary, a pair of back-to-back connected silicon controlled rectifiers connected in series with said primary for controlling alternating current flow from an alternating current source to said primary, a saturable reactor pulse generator including two saturable reactors coupled to said silicon controlled rectifiers, pulse responsive means coupling said saturable reactors polled to reset one of said reactors in response to a pulse in the other, phase shift means connected to receive alternating current from said alternating current source and coupled to said saturable reactor to control the phase of pulses generated thereby, and a source of phase control signals coupled to said phase shift means including voltage comparison means connected to compare a source of reference voltage with at least a portion of said direct current.

2. In a regulated power supply, the combination of, a power transformer including primary and secondary windings, rectifier and filter means for producing direct current connected to said secondary, a pair of reverse connected silicon controlled rectifiers connected in series with said primary for controlling alternating current flow from an alternating current source to said primary, a saturable reactor pulse generator coupled to said silicon controlled rectifiers, phase shift means connected to receive alternating current from said alternating current source and coupled to said saturable reactor to control the phase of pulses generated thereby, a source of phase control signals coupled to said phase shift means including voltage comparison means connected to compare a source of reference voltage with at least a portion of said direct current and means for disabling said pulse generator responsive to overvoltage and overtemperature of predetermined circuits of said power supply.

3. A regulated power supply as set forth in claim 2 wherein said disabling means includes a gating transistor coupled to a temperature sensitive resistor and at least a portion of the circuit carrying the output voltage of the power supply.

4. A regulated power supply as set forth in claim 2 wherein said disabling means includes a coil coupled to said saturable reactor and activated by a transistor gate which in turn is coupled to a temperature sensitive resistor and at least a portion of the output circuit of said power supply.

References Cited

UNITED STATES PATENTS

| 3,175,077 | 3/1965 | Fox et al. | 323—22 |
| 3,176,215 | 3/1965 | Kusko | 323—24 |
| 3,189,810 | 6/1965 | MacGregor | 323—22 |
| 3,218,540 | 11/1965 | Jackson | 321—18 |
| 3,289,069 | 11/1966 | Todd | 321—18 |

OTHER REFERENCES

Electrical Design News, "Magnetic Amplifier Triggers Silicon Controlled Rectifier," June 1959, pp. 20, 21.

JOHN F. COUCH, *Primary Examiner.*

W. H. BEHA, JR., *Assistant Examiner.*